United States Patent [19]

Lindmayer et al.

[11] Patent Number: 5,030,834
[45] Date of Patent: Jul. 9, 1991

[54] FIBER OPTIC DOSIMETER SYSTEM USING ELECTRON TRAPPING MATERIALS

[75] Inventors: Joseph Lindmayer, Potomac; Charles Y. Wrigley, Ijamsville, both of Md.

[73] Assignee: Quantex Corporation, Rockville, Md.

[21] Appl. No.: 281,217

[22] Filed: Dec. 8, 1988

Related U.S. Application Data

[63] Continuation-in-part of Ser. No. 127,118, Dec. 1, 1987, Pat. No. 4,855,603.

[51] Int. Cl.$^5$ .............................................. G01T 1/10
[52] U.S. Cl. ................................ 250/484.1; 250/368
[58] Field of Search .................. 250/484.1 C, 484.1 B, 250/484.1 A, 494.1 R, 368; 128/653 R

[56] References Cited

U.S. PATENT DOCUMENTS

| | | | |
|---|---|---|---|
| 2,761,070 | 8/1956 | Moos et al. | 250/484.1 C |
| 3,294,700 | 12/1966 | Bedier et al. | 250/484.1 C |
| 3,412,248 | 11/1968 | Kastner et al. | 250/484.1 C |
| 4,333,013 | 6/1982 | Burgkhardt et al. | 250/484.1 C |
| 4,492,121 | 1/1985 | Lehto | 250/227 |
| 4,507,562 | 3/1985 | Gasiot et al. | 250/484.1 C |
| 4,822,520 | 4/1989 | Lindmayer | 252/301.4 S |
| 4,855,603 | 8/1989 | Lindmayer | 250/484.1 B |

FOREIGN PATENT DOCUMENTS

| | | | |
|---|---|---|---|
| 156575 | 9/1982 | Japan | 250/227 |
| 117477 | 7/1983 | Japan | 250/368 |

OTHER PUBLICATIONS

P. Braunlich et al., "A Remote Fibre-Optic Microdosimetry Reader", Radiation Protection Dosimetry, vol. 6, No. 1-4, pp. 103-107, Nuclear Technology Publishing (1984).

Primary Examiner—Carolyn E. Fields
Attorney, Agent, or Firm—Ostrolenk, Faber, Gerb & Soffen

[57] ABSTRACT

A fiber optic dosimeter in which an electron trapping material is coated onto a tip of an optical fiber. The tip is placed in a region where radiation is to be measured, and the opposite end of the optical fiber, from which radiation readings are measured, is placed in a location remote from the radiation source. When radiation impinges upon the electron trapping material, electrons in the material are raised to a higher state where they are trapped and stay indefinitely. When infrared light strikes the material, the stored electrons are released from their traps and, upon falling to a lower energy level, emit visible light which can be detected and measured. Thus, to measure the amount of ambient radiation, the electron trapping material is stimulated with infrared light from an infrared source at the opposite end of the optical fiber. This infrared stimulation releases trapped electrons and causes the emission of visible light, at least a portion of which is collected and directed back down the optical fiber to the visible light detector, where it is converted into an electrical signal and measured.

14 Claims, 4 Drawing Sheets

5,030,834

FIBER OPTIC DOSIMETER SYSTEM USING ELECTRON TRAPPING MATERIALS

This is a continuation-in-part of U.S. Ser. No. 07/127,118, filed Dec. 1, 1987, now U.S. Pat. No. 4,855,603.

BACKGROUND OF THE INVENTION

1. Field of the Invention

The present invention relates to a system for radiation dosimetry and, more specifically, to a fiber optic dosimeter using electron trapping materials.

2. Description of the Related Art

Two types of devices are commonly used for radiation dosimetry: continuous radiation monitors or integrating radiation monitors. The most widely used continuous monitors are ionization-type dosimeters, which work by repeatedly measuring the current produced when radiation ionizes a known volume of a gas, usually air. Integrating dosimeters, on the other hand, measure the total radiation dose received over a fixed period of time. The most common integrating dosimeters are thermoluminescent dosimeters (TLD's). TLD's consist of a phosphor which, after exposure to ionizing radiation, produces a luminescence when heated, the magnitude of the luminescence being proportional to the radiation exposure.

The problem with most existing commercial dosimeters is that they are usually large in size and thus not suitable for use in small or inaccessible areas. Moreover, ionization-type dosimeters require an electrical cable between the probe and the read-out instrument. The electrical signal passing through this cable is susceptible to electromagnetic interference; also, because the current signals to be measured are usually quite small, the cable must be very short to minimize resistance. Finally, both integrating and continuous radiation monitors are generally limited to a narrow dynamic range of radiation intensities and thus require several different probe configurations to measure over a wide range of radiation intensities.

SUMMARY OF THE INVENTION

The present invention overcomes the above-noted problems and deficiencies of the prior art by providing a electron-trapping material at the tip of an optical fiber. The tip is placed in a region where radiation is to be measured, and the opposite end of the optical fiber, from which radiation readings are measured, is placed in a location remote from the radiation source.

The electron trapping material utilized in the present invention is a novel photoluminescent material which can be "charged" by the radiation to be measured; upon such energetic exposure, electrons in the material are raised to a higher state where they are "trapped" and stay indefinitely. When low energy photons (such as infrared) impinge upon the material, the stored electrons are released from their traps, and, upon falling to a lower energy level, emit blue-green light which can be detected and measured.

Thus, to measure the amount of ambient high energy radiation, it is not necessary to heat the sample (as in prior art TLD's), but only to "read" the amount of radiation "stored" by stimulating the exposed electron trapping material with infrared light. This infrared stimulation releases trapped electrons and supplies an analog of the integrated dose for the previous time interval in the form of the returned intensity of blue-green light.

Since the state of the electron trapping sensor can be tested by stimulating with light, which then supplies information in the form of yet another wavelength of light, it is possible to use an optical fiber to measure radiation at remote locations and thereby avoid problems caused by electrical interference. Also, since only a small amount of electron trapping material need be placed at the tip of the optical fiber, the invention provides a "microprobe" which can reach into small and ordinarily inaccessible locations.

The method of the present invention thus involves the following steps:

(1) exposing electron trapping material on a tip of an optical fiber to the radiation to be measured;

(2) sending infrared light down the optical fiber to release stored electrons from the traps;

(3) measuring the returned visible light (e.g., blue-green light) to correlate with the exciting radiation dose; and (4) continuing the sequence using low-intensity infrared stimulation, or "erasing" between measurements using higher intensity infrared stimulation.

The electron-trapping material used on the tip of the optical fiber preferably comprises a base formed of alkaline earth sulfides, doped with impurities from the lanthanide (rare earth) series. More specifically, the electron trapping material comprises a base material of strontium sulfide, a first dopant selected from the group of samarium, samarium oxide, samarium fluoride, samarium chloride and samariuim sulfide; a second dopant selected from the group of cerium oxide, cerium fluoride, cerium chloride, and cerium sulfide; and a fusible salt, preferably lithium fluoride. Enhanced performance is realized by the addition of a cesium halide. Barium sulfate also may be added to provide an improvement in emission efficiency.

The electron trapping material is mixed with a clear binder, overcoated with a carbon filled binder and coated onto the tip of a optical fiber to form a microprobe.

BRIEF DESCRIPTION OF THE DRAWINGS

These and other features and advantages of the present invention will become apparent when the following text is read in conjunction with the accompanying drawings, in which.

DETAILED DESCRIPTION OF THE PREFERRED EMBODIMENT

Figures 1, 2:
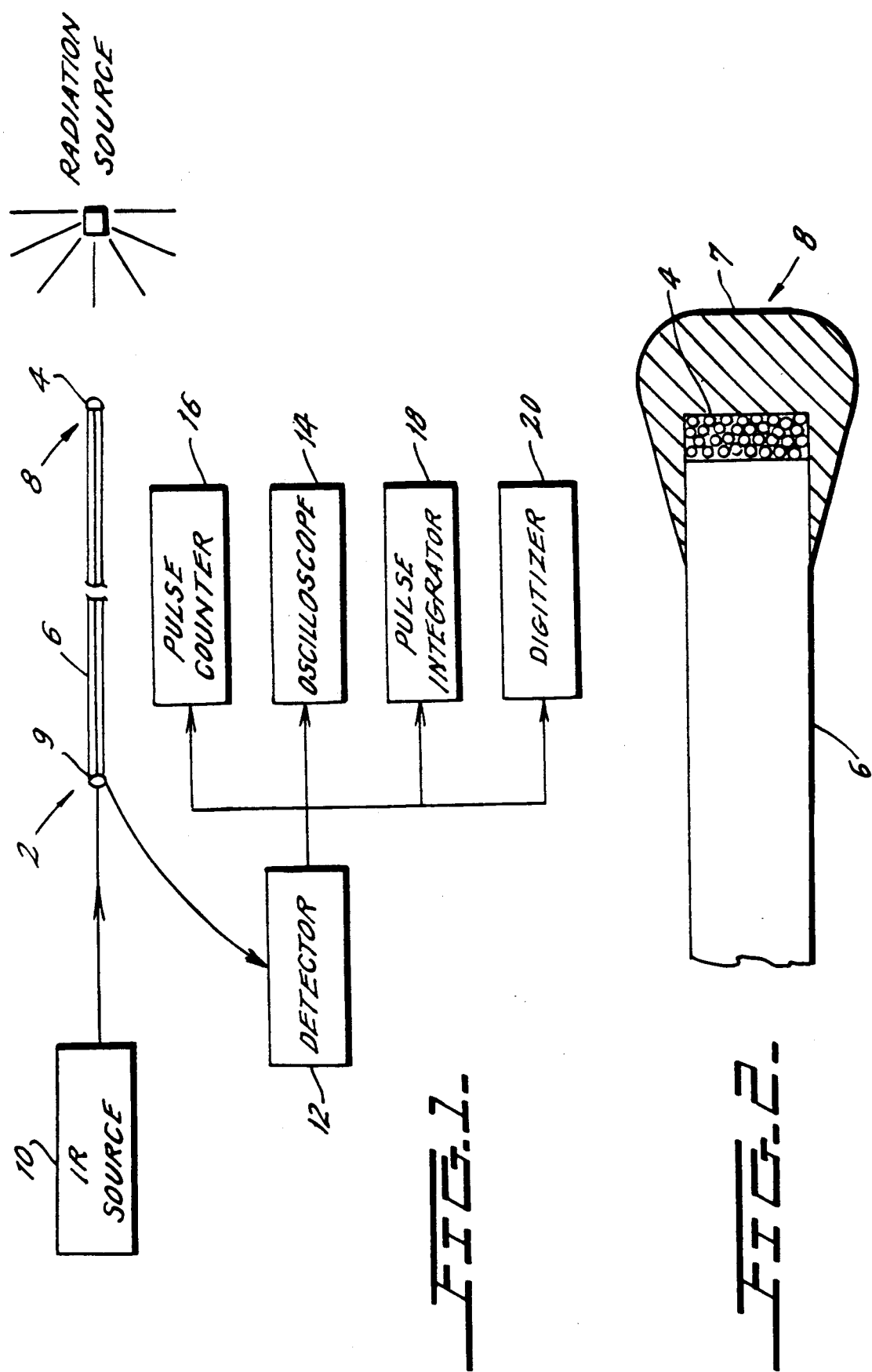
FIG. 1 is a overall schematic of the fiber optic dosimeter of the present invention.
FIG. 2 shows a magnified view of the tip of the fiber optic probe.

Referring first to FIG. 1, the fiber optic dosimeter of the present invention, indicated generally by reference numeral 2, includes a small amount of election trapping material 4 on the tip of one end of an optical fiber 6 to form a microprobe 8. The opposite end of optical fiber 6 is coupled by a two leg fiber coupler or beamsplitter 9 to an infrared source 10 and a visible light detector 12. The probe is situated so that the election trapping material on its tip is exposed to radiation emitted from a radiation source.

The electron trapping material is charged by the ambient radiation and is read out by infrared pulses emitted from IR source 10 and sent through the optical fiber 6. When the infrared light from IR source 10 strikes the charged election trapping material 4, the trapped electrons are released. As the released electrons in the electron trapping material fall to a lower energy state, photons are emitted. At least a portion of these photons are collected and directed back down optical fiber 6, and are detected at the opposite end of fiber 6 by detector 12.

Detector 12 preferably comprises off-the-shelf silicon photodetector circuitry. Alternatively, if the received visible luminescence from the electron trapping material is weak, a photomultiplier with maximum sensitivity in the visible emission wavelength spectrum can be used.

The output of detector 12 is an electrical signal which is proportional to the amount of visible light received, which is in turn proportional to the amount of radiation impinged upon electron trapping material 4. The manner in which this signal is processed depends upon the type of measurement desired. For example, if the radiation levels are sufficiently high to produce a strong signal from the electron trapping material, measurement of immediate scintillation (without infrared "reads") is possible simply by connecting the detector to an oscilloscope 14 or a counter 16 (to measure the number of received pulses/sec.).

Alternatively, the electron trapping material can be charged by the radiation to be measured and "read out" periodically by pulsing it with infrared light from IR source 10. The instantaneous visible output received by detector 12 following each infrared pulse can be quantified by measuring the pulse height using oscilloscope 14 or digitizer 20. However, this method of measurement is not preferred because the amplitude of the visible output received by detector 12 depends directly upon the intensity of infrared light which reaches electron trapping material 4. Thus, variations can occur from one measurement to the next.

The more preferred method of measurement is to use an integrator 18 coupled to infrared detector 12 to obtain an integral of the visible output vs. time. This method of measurement becomes time independent because the electron trapping material 4 is stimulated continuously with infrared until substantially all traps are depleted.

Another dosimeter method which can be used with the present invention, particularly in instances where the radiation to be measured is quite low, involves placing the probe in the radiation area and allowing it to accumulate dose over a long period of time, e.g. one day. The accumulated dose can be then read out by either of the above-described pulse-height or integration measurement techniques. One such application might involve attaching the microprobe 8 to an individual working in a nuclear facility and, at the end of the day, coupling the probe back to the IR source 10 and detector 12 to read out the radiation dose received.

The IR source 10 utilized to "read out" the energy stored in electron trapping material 4 may comprise a conventional IR LED or laser diode with appropriate circuitry for pulsing periodically or upon command. Alternatively, a low power Nd:YAG cw laser, which emits light at a wavelength of 1.064 microns, can be employed as the IR source.

The infrared light from IR source 10 is preferably focused by an objective lens (not shown) and directed into optical fiber 6. The structure of probe 8 is analogous to the tip of a match; i.e. the electron trapping material 4 is mixed with a transparent or translucent binder and coated onto the tip of optical fiber 6 as shown in FIG. 2. The tip is then overcoated with a carbon filled plastic 7 (e.g. Teflon) which serves to both protect the material and shield the material from visible light.

The energy relations present in electron trapping material 4 will now be described.

Figure 3:
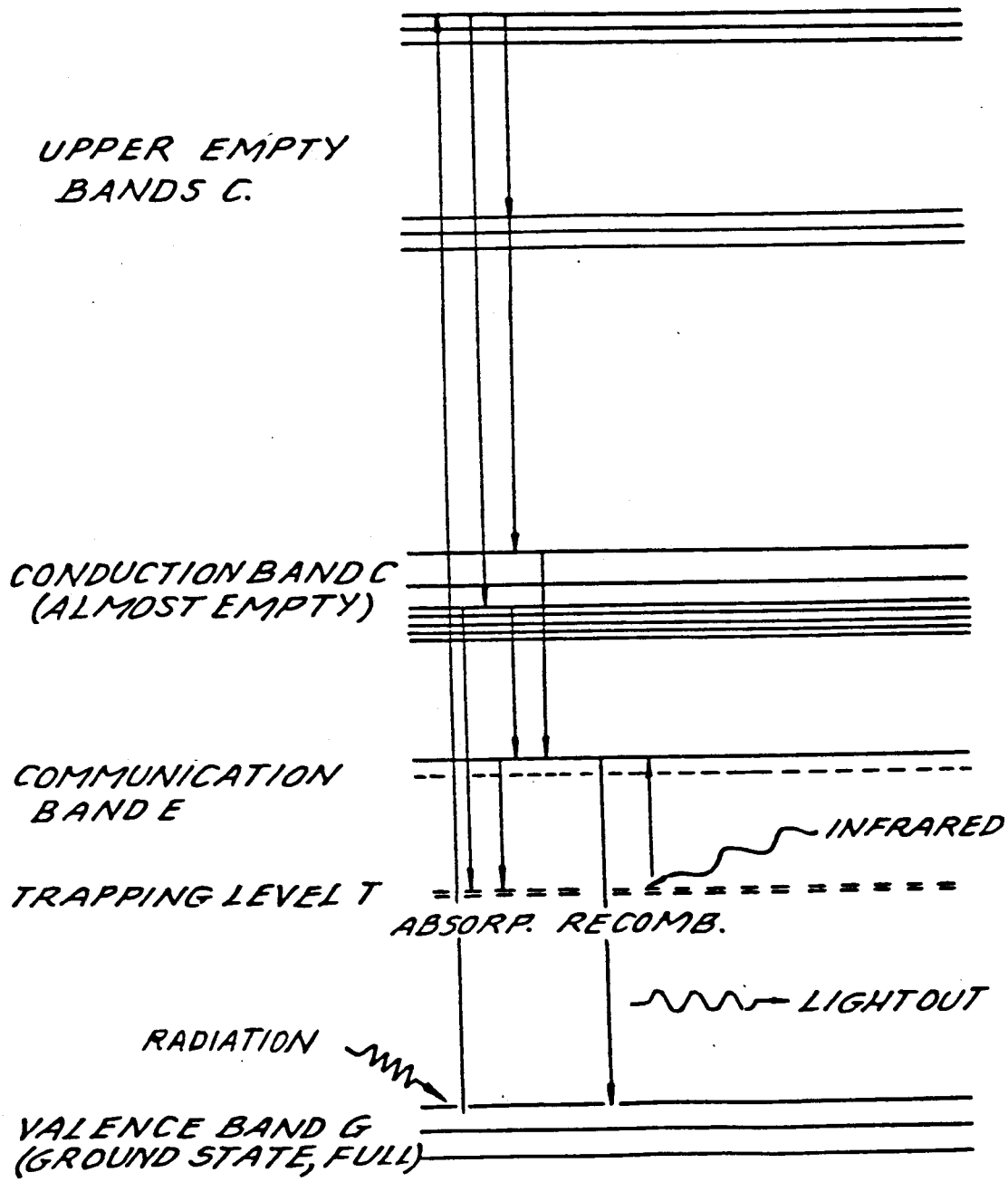
FIG. 3 is a schematic illustrating the principle of operation of the electron trapping material used in the present invention.

Referring to the energy diagram of FIG. 3, the electron trapping material has a valence band G full of electrons at a ground state. The material is subjected to high-energy particles or photons, generated by the radiation dose to be measured. The photons function to energize certain electrons in the valence band G. An electron shown on the left is originally in a valence band G and is subjected to radiation. Here, electrons absorb photons, and they rise to the communication band E and to higher bands C created by a dopant of a cerium compound.

Within a short time, electrons will attempt to return to their ground state; those that avoid traps will emit light in the form of fluorescence, while others will be captured in trapping level T, all depending upon the composition of the material and available trapping sites. Electrons in the trapping level T, will remain isolated from other electrons and trapped, holding the radiation dose.

Reading of the radiation dose is accomplished by infrared stimulation that provides sufficient additional external energy in order to raise the electrons back up to the communication band E from which they recombine, emitting blue-green light. As shown on the right side of FIG. 3, trapped electrons may be stimulated by infrared electromagnetic energy to move them back to the communication band E where they may interact with each other and fall back to band G and output photons of visible light, reconstructing the radiation dose in the process.

The materials used in dosimeter of the present invention work upon the principle illustrated by FIG. 3, whereby the radiation dose may be "stored" by the phenomenon of electron trapping and the dose may be read out by application of infrared radiation to push the electrons up above the trap and allow them to return to the valence band. The number of trapping sites, the depth of the traps, the probability of transitions occurring in the communication band and the degree of X-ray absorption are all dependent upon the composition of the material used.

The composition and preparation of the electron trapping materials used in the present invention will now be described.

As previously mentioned, the radiation-sensitive electron trapping material of the present invention comprises a composition of a base material, a first dopant, a second dopant and a fusible salt.

The base material is selected from the group of alkaline earth metal sulfides. An alkaline earth metal sulfide is a binary compound crystal containing a column IIA metal, and sulfur. Strontium sulfide is preferred because efficient light trapping and emission can be accomplished in this material and it has a high enough Z (atomic number) to absorb a significant portion of incident high energy radiation, such as X-rays. The first dopant, selected from the group of samarium, samarium oxide, samarium fluoride, samarium chloride, and samarium sulfide, provides the trapping sites. The second dopant, selected from the group of cerium oxide, cerium fluoride, cerium chloride, and cerium sulfide, establishes the communication band E and the upper bands C. It may be mentioned that while a europium compound provides somewhat better light emission efficiency the radiation sensitivity is only 1/1000th to 1/100th of that achieved with cerium making the use of europium impractical for low radiation doses.

The addition of a cesium halide to the mixture after the first heat treatment tends to improve the light output intensity by 25-50%.

In order to produce bulk materials, fusing of the components takes place by adding about 10% of fusible salts to the mixture. Fusible salts are typically compounds of elements of Column 1A and 7A of the table of elements or elements of Column IIA and 7A elements. Examples include fluorides, chlorides, bromides, or iodides of Li, Na, K, Cs, Mg, Ca, Sr, or Ba.

A number of different electron trapping material combinations may be used in the present invention. The following exemplary mixtures, which output blue-green light, have been found to be particularly sensitive to radiation.

EXAMPLE 1

| Strontium sulfide | 100 parts |
|---|---|
| Barium sulfate | 5 parts |
| Lithium fluoride | 10 parts |
| Samarium | 100 parts per million |
| Cerium oxide | 1200 parts per million |

As used above and throughout this application, "parts" and "parts per million" shall refer to parts by weight unless otherwise noted.

The mixture is placed into a graphite crucible within a furnace flushed with a dry nitrogen atmosphere (derived from a liquid source) or other dry inert atmosphere such as argon, and heated to between 950° C. and 1300° C. (preferable 1150° C.) for 30 minutes to one hour such that a fused mass is formed. For longer heating times, the fused mass could be formed at temperatures as low as 950° C. Temperatures as high as 2000° C. could be used to form such a fused mass in shorter times.

After cooling, the fused mass is ground using standard techniques into a powder having a particle size of 5 to 100 microns, suitable for matching the fiber diameter. A particle size of 2 microns or less is preferable if thin film techniques are to be used.

After grinding, the powdered material is heated to about 300° C. to 700° C. (preferably 600° C.) in the graphite crucible within the nitrogen or other inert atmosphere furnace. This second heating is below the fusing temperature of the material (about 700° C.) and is maintained for 10 to 60 minutes (preferably 30 minutes) The second heating step removes internal stresses and repairs damage done to the crystalline surfaces during the grinding step.

After the second heating, the material is cooled and the powdered material is then mixed with a suitable binder or vehicle such as acrylic polyethylene, or other organic polymer. After the material has been mixed with a transparent binder, it is applied as a thin coating to the tip of optical fiber. The coating of the photoluminescent material upon the tip of optical fiber 6 will preferably be between 1 micron and 500 microns in thickness, but in no event much greater than the diameter of the optical fiber.

In the above mixture, the strontium sulfide serves as a base material, whereas the lithium fluoride operates to provide the fusability characteristics useful for the specific embodiment. Alternatively, other alkaline earth metal sulfides might be used as the base material.

The barium sulfate in the above mixture is used to improve the brightness of output light from the material. Preferably 5 parts are used as noted above, but between 0 and 10 parts may be used of the barium sulfate as well as between 2 and 10 parts of lithium fluoride relative to the 100 parts of strontium sulfide.

As mentioned previouslY, the dopant cerium oxide in the above mixture is used for establishing the communication band E and the upper bands C. Samarium is used to establish the electron trapping level T. Preferably 180 parts per million of samarium are used, but the samarium could alternately be between 50 parts per million and 200 parts per million. The cerium oxide may be between 300 and 1500 parts per million, with 1200 parts per million being preferred. Cerium fluoride, cerium chloride or cerium sulfide could be used in lieu of cerium oxide.

Figure 4:
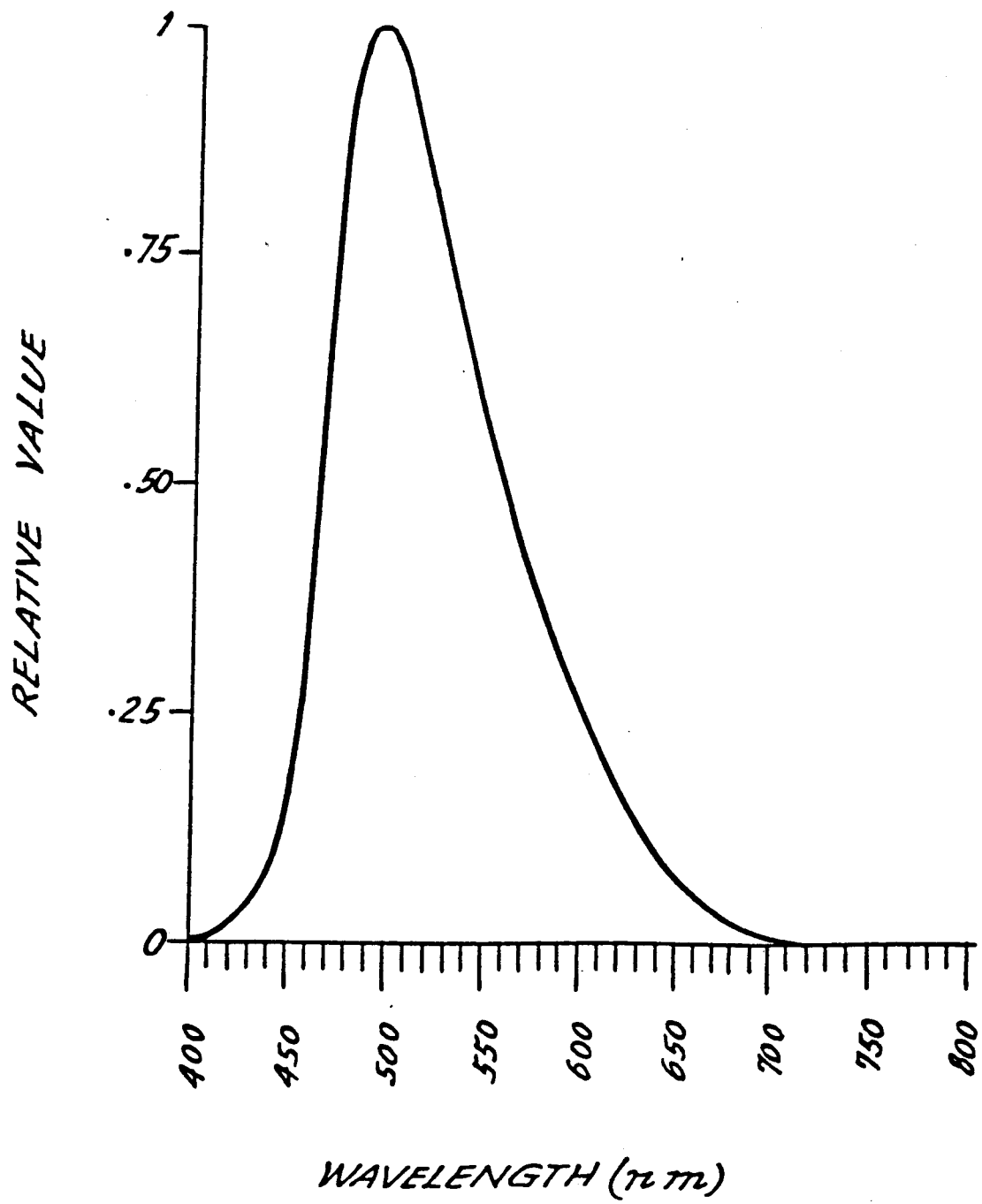
FIG. 4 shows the spectrum of light output by the electron trapping material.
Figure 5:
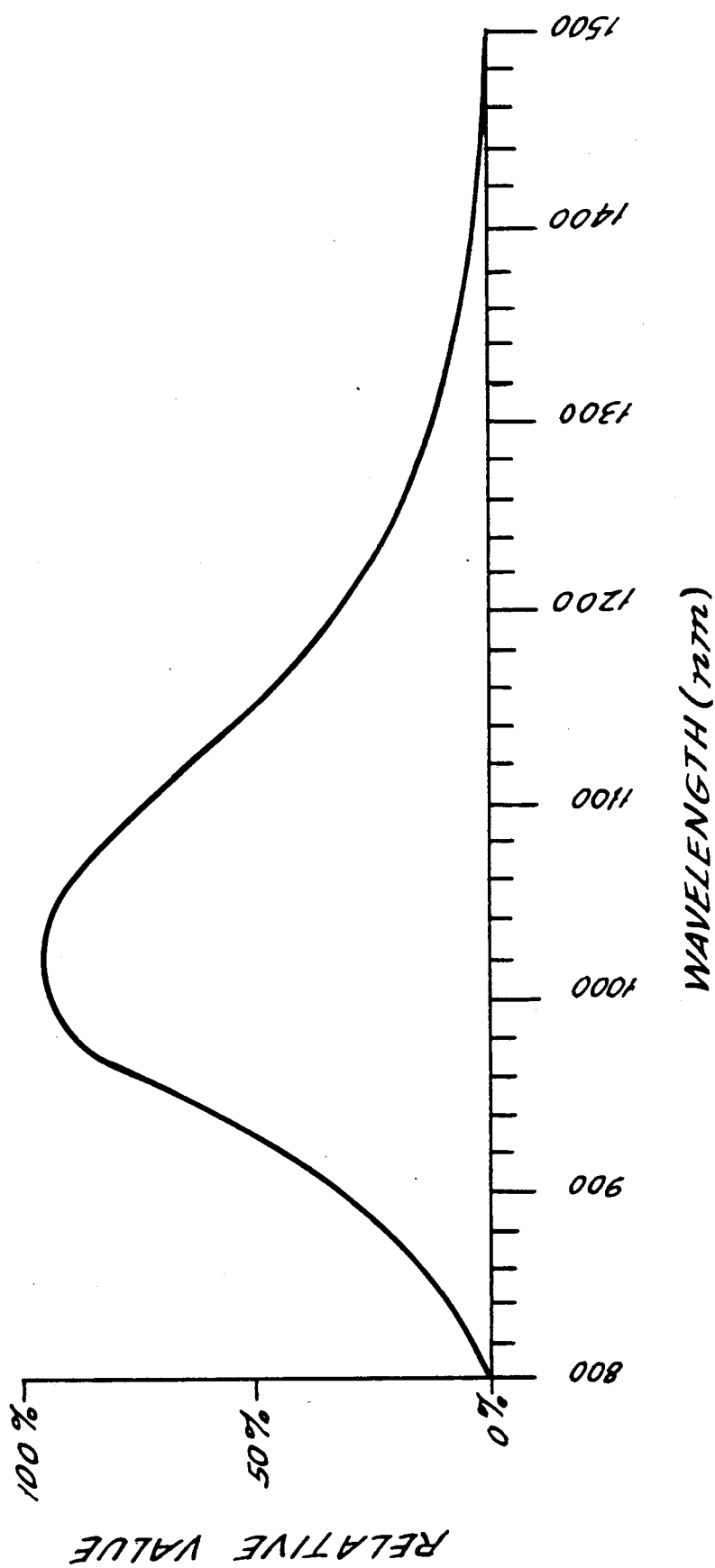
FIG. 5 shows the infrared interrogation response of the electron trapping material.

The mixture resulting from the above process provides a depth for electron traps of 1.2 electron volts below the communication band and has an output spectrum as shown in FIG. 4, which illustrates that the center frequency of the output has a wavelength of approximately 500 manometers corresponding to a blue-green light. The infrared interrogation response of the mixture is shown in FIG. 5.

EXAMPLE 2

| Strontium sulfide | 80 parts |
|---|---|
| Lithium fluoride | 10 parts |
| Barium sulfate | 10 parts |
| Samarium | 150 parts per million |
| Cerium sulfide | 1200 parts per million |
| Cesium iodide | 1 part |

The use of a cesium halide, as in Example 2, is optional; however, it does provide a significant improvement in emission efficiency. The cesium halide is added after the grinding step and prior to reheating. Preferably 150 parts per million of samarium are used in Example 2, but the samarium could alternatively be between 50 parts per million and 500 parts per million, depending upon the specific dosimeter application. For example, where long term storage is not required, the samarium concentration could be increased significantly. The cerium compound concentration may be between 200 and 2000 parts per million, with 1000 and 1500 parts per million being preferred and 1200 parts per million being the optional value. The cesium compound concentration in parts per hundred may be between 0.1 and 5, with 0.5 to 2 being preferred, and around 1 being optimum.

The mixture resulting from the above process provides a depth for electron traps of about 1.2 electron volts below the communication band and has an output spectrum very similar to that shown in FIG. 4. And an infrared interrogation response similar to that shown in FIG. 5.

The above-described electron trapping materials can be integrated with an optical fiber because it has been established that optical functions are available in grains as small as 10-20 microns (monolithic crystals are not required). The particles of the electron trapping material are fused or attached to the optical fiber. In the preferred embodiment, small amounts of small-grain phosphor powders are applied directly to the end of a fiber optic filament. The powder particles are coupled to the fiber optic filament with an organic binder (such as polyeurethane). Direct inorganic fusion to the fibers is also possible.

Fiber microprobe dosimeters have both commercial and governmental applications to determine radiation levels in power generating reactor environments, medical isotope detection microvolume remote sensing or small entry applications, and many other applications. The fiber optic dosimeter of the present invention is particularly suitable for these applications because of its unique capability to:

a) do radiation dosimetry without any electronic devices in the radiation field, using only fiber optic coupling.

b) be small enough to penetrate very small openings, leading to applications such as medical microcatheter measurements.

c) allow massive multiplexing of numerous optical fiber dosimeters while retaining integrated dose data over long intervals between addressing.

d) utilize rather low cost sensor probes interrogated by common infrared sources and evaluated by usual photodetector circuitry.

e) be accumulative in response up to a level approaching saturation, at which point they can be optically erased by either extended duration or higher intensity infrared stimulation.

Although the present invention has been described in connection with preferred embodiments thereof, many variations and modifications will now become apparent to those skilled in the art. It is preferred, therefore, that the present invention be limited not by the specific disclosure herein, but only by the appended claims.

What is claimed is:

1. A fiber optic dosimeter system, comprising:
   an optical fiber having first and second ends;
   a radiation-sensitive infrared stimulable phosphor coated onto the tip of the first end of said optical fiber, said phosphor comprising:
      a base material of substantially strontium sulfide,
      a first dopant of samarium, and
      a second dopant of selected from the group consisting of cerium oxide, cerium fluoride, cerium chloride, and cerium sulfide,
   said phosphor having a plurality of energy levels and having the capability to trap electrons in a trapping energy level when electrons attempt to return to a ground state after having been excited above said trapping energy level as a result of impingement of radiation upon said material;
   a stimulating source optically coupled to the second end of said optical fiber for providing infrared energy through said optical fiber to said phosphor to raise said trapped electrons to a higher energy level, from which said electrons recombine and fall back to said ground state, emitting visible light defined as optically stimulated luminescence, such that said phosphor acts as an upconverter with respect to said stimulating infrared energy; and
   a visible light sensor coupled to the second end of said optical fiber for detecting the portion of said optically stimulated luminescence which passes back through said optical fiber to said visible light sensor and for converting the detected optically stimulated luminescence to an electrical signal proportional to the amount of radiation impinging upon the phosphor.

2. A fiber optic dosimeter system as recited in claim 1, wherein the samarium dopant is provided in a quantity of between 50 to 500 parts per million by weight, and the cerium dopant comprises cerium sulfide and is provided in a quantity of between 200 to 2000 parts per million by weight.

3. A fiber optic dosimeter system as recited in claim 2, further comprising a cesium halide.

4. A fiber optic dosimeter system as recited in claim 3, wherein said cesium halide comprises cesium iodide.

5. A fiber optic dosimeter system as recited in claim 4, wherein said cesium iodide is provided in a quantity of between 0.1 to 2 parts per hundred by weight.

6. A fiber optic dosimeter system as recited in claim 1, further comprising barium sulfate.

7. A fiber optic dosimeter system as recited in claim 6, wherein the barium sulfate is provided in a quantity of up to 10 parts for every 100 parts of base material.

8. A fiber optic dosimeter system as recited in claim 1, further comprising a fusible salt.

9. A fiber optic dosimeter system as recited in claim 8, wherein said fusible salt comprises lithium fluoride.

10. A fiber optic dosimeter system as recited in claim 9, wherein said lithium fluoride is provided in a quantity of up to 10 parts per 100 parts of base material.

11. A fiber optic dosimeter system as recited in claim 1, further comprising integrator circuitry for integrating the electrical signal from said sensor, the integrated electrical signal being proportional to the total radiation impinged upon said photoluminescent material in the time between exposures from said stimulating source.

12. A method of fiber optic dosimetry, comprising the steps of:
   (a) exposing a radiation-sensitive infrared stimulable phosphor on a tip of a first end of an optical fiber to radiation to be measured to raise electrons in the phosphor from a ground energy level to an elevated energy storage level, said phosphor comprising:
      a base material of substantially strontium sulfide,
      a first dopant of samarium, and
      a second dopant of selected from the group consisting of cerium oxide, cerium fluoride, cerium chloride, and cerium sulfide;
   (b) sending optical stimulation in the form of infrared energy through the optical fiber from a second end of said optical fiber to the phosphor to release trapped electrons from said elevated energy storage level, the released electrons emitting optically stimulated luminescence in the form of visible light upon falling to said ground energy level, such that said phosphor acts as an upconverter with respect to said infrared optical stimulation; and
   (c) measuring said optically stimulated luminescence at said second end of said optical fiber.

13. A method of fiber optic dosimetery as recited in claim 12, further comprising repeating steps (a) through (c) using infrared pulses as said optical stimulation.

14. A method of fiber optic dosimetry as recited in claim 12, further comprising integrating the measurements of said optically stimulated luminescence at said second end of said optical fiber to produce a measurement of the total radiation dose received by said phosphor at said first end of said optical fiber, said measurement being independent of the intensity of said optical stimulation.

* * * * *